US010358922B2

United States Patent
Sippel

(10) Patent No.: US 10,358,922 B2
(45) Date of Patent: Jul. 23, 2019

(54) TURBINE WHEEL WITH CIRCUMFERENTIALLY-INSTALLED INTER-BLADE HEAT SHIELDS

(71) Applicant: Rolls-Royce Corporation, Indianapolis, IN (US)

(72) Inventor: Aaron D. Sippel, Zionsville, IN (US)

(73) Assignee: Rolls-Royce Corporation, Indianapolis, IN (US)

(*) Notice: Subject to any disclaimer, the term of this patent is extended or adjusted under 35 U.S.C. 154(b) by 229 days.

(21) Appl. No.: 15/348,051

(22) Filed: Nov. 10, 2016

(65) Prior Publication Data

US 2018/0128110 A1    May 10, 2018

(51) Int. Cl.
  *F01D 5/08* (2006.01)
  *F01D 11/00* (2006.01)
  *F01D 5/30* (2006.01)

(52) U.S. Cl.
  CPC ............... *F01D 5/08* (2013.01); *F01D 5/30* (2013.01); *F01D 11/008* (2013.01); *F01D 5/3092* (2013.01); *F05D 2220/32* (2013.01); *F05D 2240/15* (2013.01); *F05D 2240/80* (2013.01); *F05D 2260/231* (2013.01); *F05D 2300/6033* (2013.01); *Y02T 50/672* (2013.01); *Y02T 50/673* (2013.01); *Y02T 50/676* (2013.01)

(58) Field of Classification Search
  CPC ...... F01D 5/08; F01D 5/3092; F05D 2240/80; F05D 2260/231; F05D 2220/32
  See application file for complete search history.

(56) References Cited

U.S. PATENT DOCUMENTS

| | | | |
|---|---|---|---|
| 4,019,832 A | 4/1977 | Salemme et al. | |
| 4,022,547 A | 5/1977 | Stanley et al. | |
| 5,318,406 A | 6/1994 | Bardes | |
| 5,375,978 A | 12/1994 | Evans et al. | |
| 5,429,478 A * | 7/1995 | Krizan | F01D 11/001 415/115 |
| 5,449,649 A | 9/1995 | Li et al. | |
| 5,735,671 A * | 4/1998 | Brauer | F01D 5/081 415/177 |
| 6,361,273 B1 * | 3/2002 | Eng | F01D 9/00 415/173.1 |
| 6,676,373 B2 | 1/2004 | Marlin et al. | |
| 6,832,896 B1 | 12/2004 | Goga et al. | |
| 7,510,379 B2 | 3/2009 | Marusko et al. | |
| 7,766,609 B1 * | 8/2010 | Liang | F01D 9/041 415/138 |

(Continued)

FOREIGN PATENT DOCUMENTS

CN    102996183 B    6/2016
JP    2196104 A    8/1990

(Continued)

*Primary Examiner* — Nathaniel E Wiehe
*Assistant Examiner* — Andrew J Marien
(74) *Attorney, Agent, or Firm* — Barnes & Thornburg LLP

(57) ABSTRACT

A turbine wheel assembly adapted for use in a gas turbine engine is disclosed. The turbine wheel assembly includes a disk configured to rotate about an axis during operation of the gas turbine engine, turbine blades coupled with the disk, and heat shields arranged between turbine blades. The turbine wheel assembly includes components optionally made from ceramic matrix composite materials such as the turbine blades and/or heat shields.

18 Claims, 3 Drawing Sheets

(56) References Cited

U.S. PATENT DOCUMENTS

| | | | |
|---|---|---|---|
| 7,874,804 B1 | 1/2011 | Brown | |
| 8,182,210 B2* | 5/2012 | Khanin | F01D 9/06 415/173.1 |
| 8,496,443 B2* | 7/2013 | Campbell | F01D 5/081 416/248 |
| 8,739,547 B2 | 6/2014 | Jarmon et al. | |
| 8,740,571 B2 | 6/2014 | Garcia-Crespo | |
| 8,790,067 B2 | 7/2014 | McCaffrey et al. | |
| 8,821,127 B1* | 9/2014 | Knecht | F01D 5/021 29/889.2 |
| 8,864,492 B2 | 10/2014 | Shi et al. | |
| 8,920,127 B2 | 12/2014 | McCaffrey | |
| 8,944,770 B2 | 2/2015 | Alvanos et al. | |
| 8,951,015 B2* | 2/2015 | Brandl | F01D 5/147 416/219 R |
| 8,967,974 B2 | 3/2015 | Garcia-Crespo | |
| 8,985,956 B2 | 3/2015 | Hogberg | |
| 9,011,085 B2 | 4/2015 | Suciu et al. | |
| 9,212,560 B2 | 12/2015 | McCaffrey | |
| 9,228,443 B2* | 1/2016 | Tarczy | F01D 5/3069 |
| 9,308,708 B2 | 4/2016 | Kleinow | |
| 9,335,051 B2 | 5/2016 | Jarmon et al. | |
| 9,376,916 B2 | 6/2016 | McCaffrey et al. | |
| 9,410,437 B2 | 8/2016 | Paige et al. | |
| 9,458,726 B2 | 10/2016 | Lamusga et al. | |
| 9,482,108 B2 | 11/2016 | Garcia Crespo | |
| 2002/0197507 A1* | 12/2002 | Narasimhan | C23C 8/02 428/655 |
| 2004/0179936 A1* | 9/2004 | Fitzgerald | F01D 5/082 415/116 |
| 2007/0020102 A1* | 1/2007 | Beeck | F01D 5/3007 416/219 R |
| 2008/0022693 A1* | 1/2008 | Dicic | F01D 5/03 60/805 |
| 2009/0257875 A1 | 10/2009 | McCaffrey et al. | |
| 2010/0124502 A1* | 5/2010 | Brandl | F01D 5/147 416/193 A |
| 2012/0063912 A1 | 3/2012 | Bouillon et al. | |
| 2012/0087795 A1* | 4/2012 | Garin | F01D 11/008 416/193 A |
| 2012/0301269 A1 | 11/2012 | Alvanos et al. | |
| 2012/0301317 A1 | 11/2012 | Alvanos et al. | |
| 2013/0004325 A1 | 1/2013 | McCaffrey et al. | |
| 2013/0004326 A1 | 1/2013 | McCaffrey | |
| 2013/0064668 A1 | 3/2013 | Paige, II et al. | |
| 2013/0071248 A1 | 3/2013 | Hogberg | |
| 2013/0171001 A1 | 7/2013 | Garcia-Crespo | |
| 2013/0251939 A1 | 9/2013 | Kleinow | |
| 2015/0003978 A1 | 1/2015 | Watanabe | |
| 2015/0101349 A1* | 4/2015 | Hansen | F01D 5/303 60/805 |
| 2015/0192027 A1 | 7/2015 | Paige et al. | |
| 2016/0230562 A1* | 8/2016 | Carrico | F04D 29/321 |
| 2016/0265384 A1* | 9/2016 | Walston | F01D 25/12 |
| 2016/0312622 A1* | 10/2016 | Burbaum | F01D 5/187 |
| 2017/0284221 A1* | 10/2017 | Watanabe | C04B 35/80 |

FOREIGN PATENT DOCUMENTS

| | | |
|---|---|---|
| JP | 2007071185 A | 3/2007 |
| WO | 2013054798 A1 | 4/2013 |
| WO | 2014109246 A1 | 7/2014 |
| WO | 2014165467 A1 | 10/2014 |
| WO | 2015053911 A1 | 4/2015 |

* cited by examiner

TURBINE WHEEL WITH CIRCUMFERENTIALLY-INSTALLED INTER-BLADE HEAT SHIELDS

FIELD OF THE DISCLOSURE

The present disclosure relates generally to turbine wheels, and more specifically to turbine wheels including a disk with number of turbine blades coupled thereto.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Hot, high-pressure products of the combustion reaction in the combustor are directed into the turbine where work is extracted to drive the compressor and, sometimes, an output shaft. Left-over products of the combustion are exhausted out of the turbine and may provide thrust in some applications.

Turbines typically include alternating stages of static vane assemblies and rotating wheel assemblies. Rotating wheel assemblies can be made from disks with a number of blades coupled around a periphery thereof. To withstand hot combustion products from the combustor, designing rotating wheel assemblies that incorporate materials designed to withstand high temperatures is an area of interest. Ceramic matrix composite materials can withstand high temperatures but present design challenges related to mechanical strength and durability.

SUMMARY

The present disclosure may comprise one or more of the following features and combinations thereof.

According to one aspect of the present disclosure, an assembly may include a turbine disk, a plurality of turbine blades, and a plurality of heat shields. The turbine disk may comprise metallic materials that extend around a central axis. The turbine disk may include a central plate and a rim that extends around a periphery of the central plate. The plurality of turbine blades may be coupled to the turbine disk. Each turbine blade may include a root received in a corresponding slot in the turbine disk to couple the turbine blade to the turbine disk and an airfoil that extends outwardly from the turbine disk away from the central axis. The plurality of heat shields may comprise ceramic matrix composite materials.

In some embodiments, each heat shield may be arranged circumferentially between adjacent turbine blades. Each heat shield may be shaped to form a radially-inwardly opening channel that receives a portion of the rim of the turbine disk to couple the heat shield to the turbine disk so that movement of hot gasses interacting with the airfoils of the turbine blades toward the turbine disk is resisted during use of the turbine wheel assembly in a gas turbine engine.

In some embodiments, each turbine blade may include a platform arranged radially between the root and the airfoil that extends circumferentially around a portion of the rim so that movement of hot gasses interacting with the airfoils of the turbine blades toward the turbine disk is resisted during use of the turbine wheel assembly in a gas turbine engine. The platform of each turbine blade may extend circumferentially in both directions from a pressure side and a suction side of a corresponding airfoil around a portion of the rim.

In some embodiments, the platform of at least one turbine blade may extend circumferentially in only one direction from a corresponding airfoil around a portion of the rim. At least one of the plurality of heat shields may be formed to include a cutout that receives a portion of a corresponding airfoil. The platform of at least one turbine blade may extend circumferentially in both directions from a pressure side and a suction side of a corresponding airfoil around a portion of the rim.

In some embodiments, most of the heat shields may be formed to include cutouts on opposing circumferential sides. The cutouts on opposing circumferential sides may receive a portion of an airfoil included in adjacent turbine blades.

In some embodiments, the rim of the turbine disk may extend axially forward and aft of the central plate adjacent to the rim. A circumferential length of a radially outer portion of at least one slot in the turbine disk may be greater than the circumferential length of each of the plurality of heat shields. A portion of each heat shield may be arranged radially inward of the rim. A portion of each heat shield may interface with the rim both forward and aft of the central plate.

According to another aspect of the present disclosure, an assembly may comprise a turbine disk, a plurality of turbine blades, and a plurality of heat shields. The turbine disk may comprise metallic materials that extend around a central axis. The turbine disk may include a central plate and a rim that extends around a periphery of the central plate. The plurality of turbine blades may be coupled to the turbine disk. Each turbine blade may include a root received in a corresponding slot in the turbine disk to couple the turbine blade to the turbine disk and an airfoil that extends outwardly from the turbine disk away from the central axis. The plurality of heat shields may be comprised of ceramic matrix composite material. The plurality of heat shields may be coupled to the turbine disk.

In some embodiments, each heat shield may be shaped to receive a portion of the rim of the turbine disk to block radially outward movement of the heat shield out of engagement with the disk. At least a portion of each heat shield may be C-shaped when viewed in a circumferential direction around the central axis. Each heat shield may form a radially-inwardly opening channel that receives the portion of the rim. A circumferential length of a radially outer portion of at least one slot in the turbine disk may be greater than the circumferential length of each of the plurality of heat shields.

In some embodiments, the rim of the turbine disk may extend axially forward and aft of the central plate adjacent to the rim. A portion of each heat shield may be arranged radially inward of the rim in confronting relation with the rim both forward and aft of the central plate to block radially outward movement of the heat shield out of engagement with the disk.

In some embodiments, each turbine blade may include a platform arranged radially between the root and the airfoil that extends circumferentially around a portion of the rim so that movement of hot gasses interacting with the airfoils of the turbine blades toward the turbine disk is resisted during use of the turbine wheel assembly in a gas turbine engine. The platform of each turbine blade may extend circumferentially in both directions from a pressure side and a suction side of a corresponding airfoil around a portion of the rim.

In some embodiments, the platform of at least one turbine blade may extend circumferentially in only one direction from a corresponding airfoil around a portion of the rim. At least one of the plurality of heat shields may be formed to include a cutout that receives a portion of a corresponding airfoil. The platform of at least one turbine blade may extend circumferentially in both directions from a pressure side and a suction side of a corresponding airfoil around a portion of the rim.

In some embodiments, at least one turbine blade may include a platform arranged radially between the root and the airfoil that extends circumferentially in both directions from a pressure side and a suction side of a corresponding airfoil around a portion of the rim. Most turbine blades may transition smoothly from the root to the airfoil without a platform. Most of the heat shields may be formed to include cutouts on opposing circumferential sides that receive a portion of an airfoil included in adjacent turbine blades.

These and other features of the present disclosure will become more apparent from the following description of the illustrative embodiments.

DETAILED DESCRIPTION OF THE DRAWINGS

Figure 1:
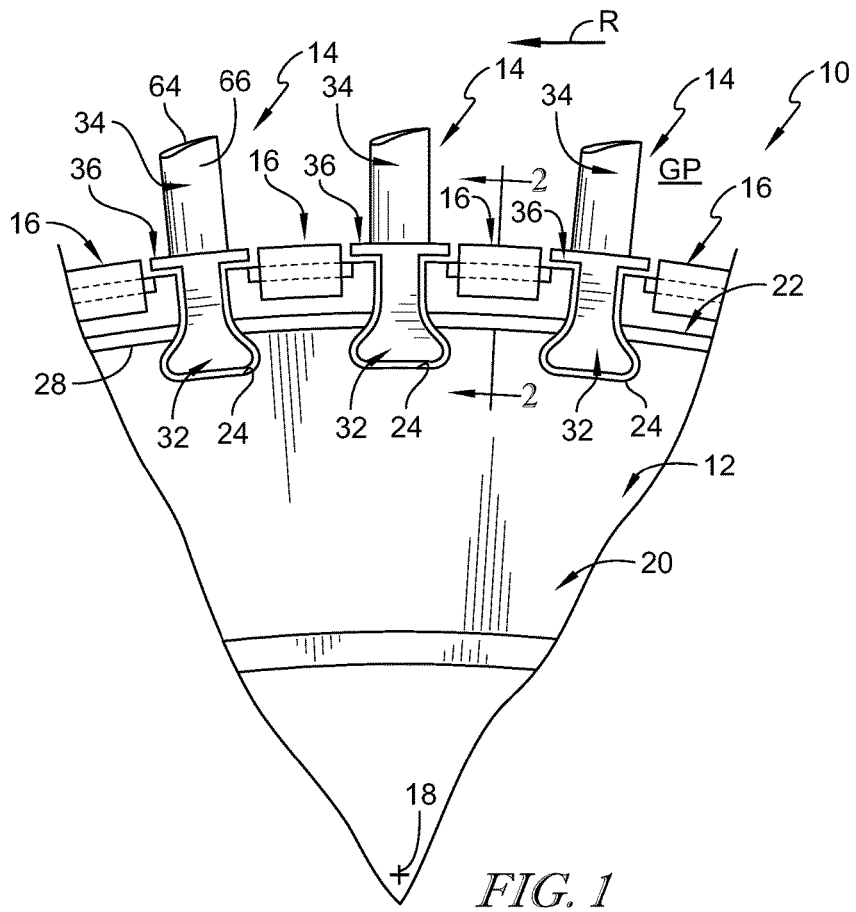
FIG. 1 is a front elevation view of a portion of a turbine wheel assembly including a disk that extends around a central axis, a plurality of turbine blades coupled to the disk by dovetail roots inserted into slots of the disk about its periphery, and a plurality of heat shields coupled to the disk about its periphery between adjacent turbine blades.

For the purposes of promoting an understanding of the principles of the disclosure, reference will now be made to a number of illustrative embodiments illustrated in the drawings and specific language will be used to describe the same.

An illustrative turbine wheel assembly 10 for use in a gas turbine engine includes a turbine disk 12, a plurality of turbine blades 14, and a plurality of heat shields 16 as shown in FIG. 1. The turbine wheel assembly 10 is exposed to hot, high pressure combustion gasses that expand through a gas path GP defined through the turbine and cause the turbine wheel assembly 10 to rotate about a central axis 18 in the direction of the arrow R to output power in a gas turbine engine. The heat shields 16 are separate from but cooperate with platforms 36 of each turbine blade 14 to define an inner annulus of the gas path GP and resist movement of gasses radially inward out of or radially outward into the gas path GP.

Figure 2:
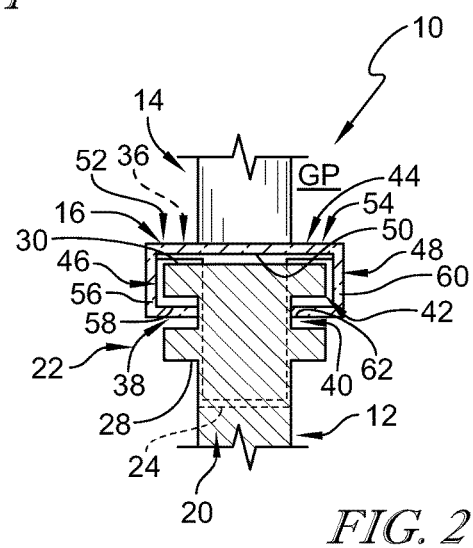
FIG. 2 is a cross-sectional view of the turbine wheel assembly of FIG. 1 showing that the heat shields are made from ceramic matrix composite materials and that the heat shields are shaped to include radially-inwardly opening channels that receive an outer rim of the disk so that the heat shields are coupled to the disk.

The turbine disk 12 is comprised of metallic materials and extends around the central axis 18 as shown in FIG. 1. The turbine disk 12 includes a central plate 20 and a rim 22. The turbine disk 12 is formed to include a plurality of slots 24 spaced circumferentially around the periphery of turbine disk 12. The rim 22 extends around a periphery of the central plate 20 and includes an inner surface 28 that borders the periphery of the central plate 20 and outer surface 30 positioned radially opposite the inner surface 28. The rim 22 is formed to include a forward groove 38 that opens in the axially-forward facing direction and an aft groove 40 that opens in an axially-aft facing direction as shown in FIGS. 1 and 2. The slots 24 extend radially inward toward the central axis 18 from the outer surface 30 of the rim 22 through the rim 22 and into the central plate 20.

The plurality of turbine blades 14 interact with high pressure combustion gasses causing the turbine wheel assembly 10 to rotate as suggested by arrow R in FIG. 1. Each turbine blade 14 is made of ceramic matrix composite materials and includes a root 32, an airfoil 34, and a platform 36. The root 32 illustratively has a dove tail shape and is received in the slot 24 to couple the turbine blade 14 to the turbine disk 12. In other embodiments, the root 32 may have a fir tree shape or other shape for coupling the turbine blades 14 to the turbine disk 12. The airfoil 34 extends radially outward of the turbine disk 12 away from the central axis 18 and is shaped to aerodynamically interact with hot combustion gasses. The platform 36 is arranged radially between the root 32 and the airfoil 34. The platform 36 extends circumferentially away from the airfoil 34 around a portion of the turbine disk 12 in both directions and resists radial movement of gasses into and out of the gas path GP where the airfoil 34 interacts with combustion products.

Each heat shield 16 is comprised of ceramic matrix composite materials capable of withstanding high temperature environments as suggested in FIG. 2. Each heat shield 16 is arranged circumferentially between platforms 36 of adjacent turbine blades 14 as shown in FIG. 1. The heat shields 16 cooperate with the platforms 36 to resist movement of hot gasses interacting with the airfoils 34 toward the roots 32 during use of the turbine wheel assembly 10 in a gas turbine engine. In the illustrative embodiment, small circumferential gaps may be formed between the heat shields 16 and adjacent airfoils 14. Seals, such as strip seals, may optionally be used to fill these gaps.

Each heat shield 16 is shaped to define a C-shape when viewed circumferentially and form a radially-inwardly opening channel 42 as shown in FIG. 2. The radially-inwardly opening channel 42 receives a portion of the rim 22 of the turbine disk 12 as shown in FIG. 2. Each heat shield 16 includes an outer panel 44, a forward retainer 46, and an aft retainer 48. The outer panel 44 includes an inner surface 50 that faces toward the outer surface 30 of the rim 22, a forward end 52, and an aft end 54 positioned axially opposite the forward end 52 as shown in FIG. 2.

The forward retainer 46 includes a radial arm 56 and an axial arm 58 as shown in FIG. 2. The radial arm 56 that is coupled to the forward end 52 of the outer panel 44 and extends radially inward away from the outer panel 44 toward the central axis 18. The axial arm 58 is coupled to the radial arm 56 opposite the outer panel 44 and extends circumferentially aft away from the radial arm 56 toward the aft retainer 48 as shown in FIG. 2. The axial arm 58 of the forward retainer 46 has a width less than the width of the forward groove 38, such that the axial arm 58 is sized to be inserted into the forward groove 38 to couple the heat shield 16 to the turbine disk 12.

The aft retainer 48 includes a radial arm 60 and an axial arm 62 as shown in FIG. 2. The radial arm 60 is coupled to the aft end 54 of the outer panel 44 and extends radially inward away from the outer panel 44 toward the central axis 18. The axial arm 62 is coupled to the radial arm 60 opposite the outer panel 44 and extends circumferentially forward away from the radial arm 60 toward the forward retainer 46 as shown in FIG. 2. The axial arm 62 of the aft retainer 48 has a width less than the width of the aft groove 40, such that the axial arm 62 is sized to be inserted into the aft groove 40 to couple the heat shield 16 to the turbine disk 12.

Figure 3:
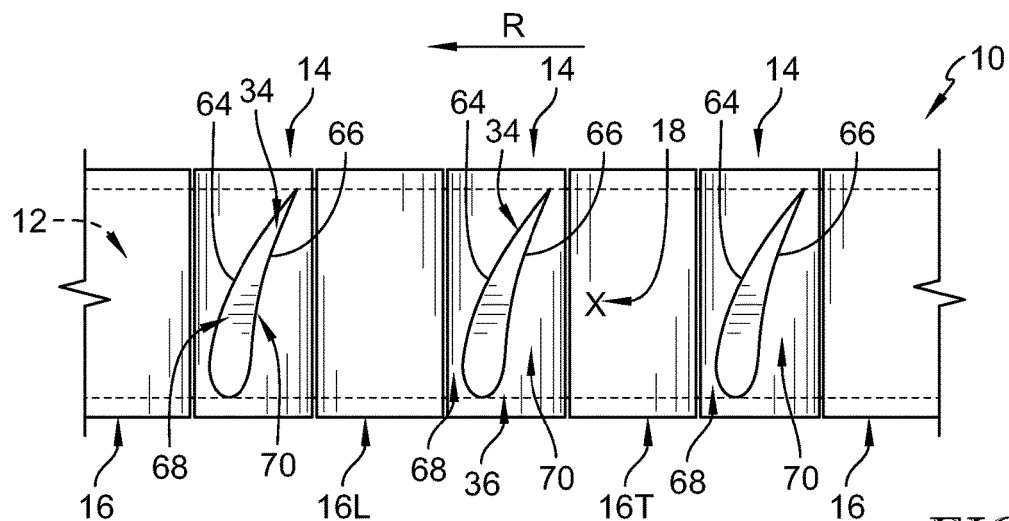
FIG. 3 is a top plan view of the turbine wheel assembly of FIG. 1 showing that each turbine blade includes a platform extending from both pressure and suction sides of an airfoil and that the heat shields are arranged between platforms to provide a band around the disk that is configured to resist hot gasses from moving radially inward toward the disk.

In the illustrative embodiment shown in FIG. 3, each airfoil 34 includes a suction surface 64 and a pressure surface 66. The suction surface 64 extends along the curvature of the airfoil 34 generally associated with higher velocity and lower static pressure. The pressure surface 66 extends along the curvature of the airfoil 34 that generally has a comparatively higher static pressure than the suction surface 64. The platform 36 of each turbine blade 14 includes a suction side 68 and a pressure side 70. The suction side 68 is coupled to the suction surface 64 of the airfoil 34 and extends circumferentially away from the airfoil 34 toward an adjacent heatshield 16L that leads the platform 36 as the turbine wheel assembly 10 rotates about the central axis 18 in the direction of the arrow R. The pressure side 70 is coupled to the pressure surface 66 of the airfoil 34 and extends circumferentially away from the airfoil 34 toward an adjacent heatshield 16T that trails the platform 36 as the turbine wheel assembly 10 rotates about the central axis 18 in the direction of the arrow R. Each platform 36 abuts the leading adjacent heat shield 16L and the trailing adjacent heat shield 16T so that movement of hot gasses interacting with the airfoils 34 of the turbine blades 14 toward the turbine disk 12 is resisted during use of the turbine wheel assembly 10 in a gas turbine engine, as illustratively shown in FIGS. 1 and 3.

Figure 4:
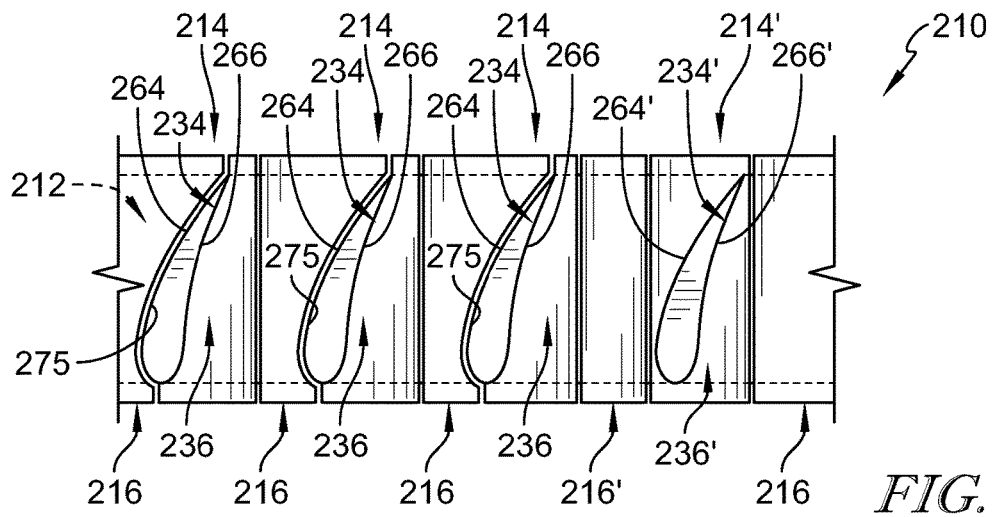
FIG. 4 is a top plan view of a second turbine wheel assembly according to the present disclosure showing that most turbine blades include a platform extending from a pressure side of an airfoil and that most of the heat shields have a cutout shaped to correspond to a suction side of an airfoil to close the gap between a platform and a suction side of adjacent turbine blades, and showing that a keystone turbine blade includes a platform extending from both pressure and suction sides of an airfoil such that a corresponding keystone heat shield need not include a cutout.

Another illustrative turbine wheel assembly 210 in accordance with the present disclosure is shown in FIG. 4. The turbine wheel assembly 210 is substantially similar to the turbine wheel assembly 10 shown in FIGS. 1-3. Accordingly, similar reference numbers in the 200 series indicate features that are common between the turbine wheel assembly 10 and the turbine wheel assembly 210 (For example 212, 264, 264', and 266'). The description of the turbine wheel assembly 10 is incorporated by reference to apply to the turbine wheel assembly 210, except in instances when it conflicts with the specific description and the drawings of the turbine wheel assembly 210.

The turbine wheel assembly 210 illustratively includes a plurality of turbine blades 214 and a plurality of heat shields as shown in FIG. 4. Platforms 236 of turbine blades 214 cooperate with heat shields 216 to resist movement of gasses radially inward out of or radially outward into the gas path GP.

Unlike the platforms 36 of turbine blades 14, most of the platforms 236 included in the turbine blades 214 extend circumferentially in only one direction from airfoils 234 as shown in FIG. 4. More specifically, the platforms 236 only extend from pressure sides 266 of the airfoils 234. However, in other embodiments, the platforms 236 may only extend from suction sides 264 of the airfoils 234.

To accommodate use of the platforms 236, most of the heat shields 216 receive a portion of a corresponding airfoil 234 as shown in FIG. 4. In the illustrative embodiment, most heat shields 216 are formed to include a cutout 275 shaped to conform to the received portion of a corresponding airfoil 234. More specifically, in the illustrated embodiment, the cutout 275 is shaped to receive the pressure side of a corresponding airfoil 234.

In the embodiment shown in FIG. 4, a keystone turbine blade 214' and a keystone heat shield 216' are included in the turbine wheel assembly 210. The keystone turbine blade 214' and keystone heat shield 216' are illustratively included to allow for assembly of the turbine wheel 210. The keystone turbine blade 214' includes a platform 236' that extends circumferentially away from a corresponding airfoil 234' in both circumferential directions. The keystone heat shield 216' does not include a cutout that receives any portion of an airfoil. The keystone heat shield 216' cooperates with the platforms 236 and 236' to resist movement of hot gasses interacting with the airfoils 234 and 234' moving radially inward from the gas path GP.

Figure 5:
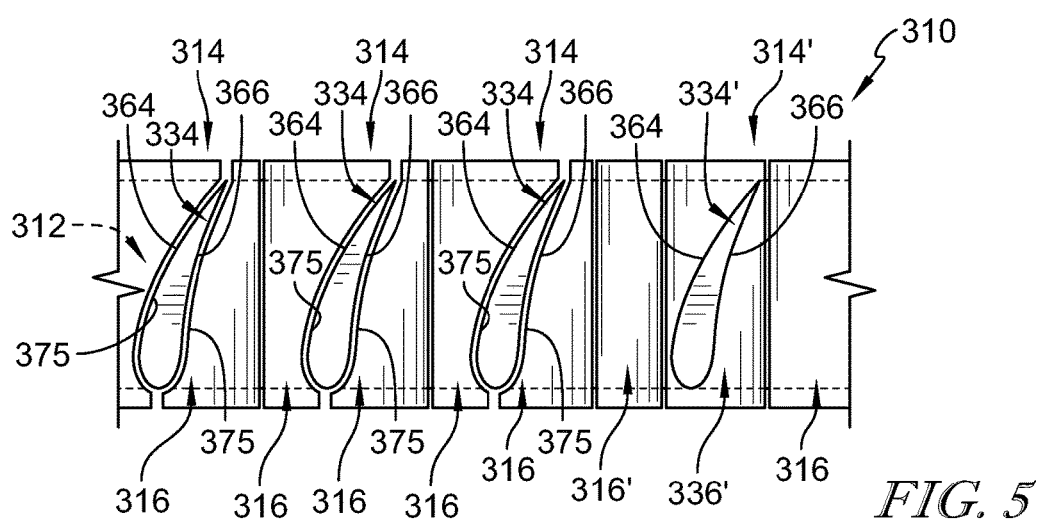
FIG. 5 is a top plan view of a third turbine wheel assembly according to the present disclosure showing that most turbine blades do not include a platform and that most of the heat shields have cutouts shaped to correspond to pressure and suction sides of adjacent airfoils included in turbine blades, and showing that a keystone turbine blade includes a platform extending from both pressure and suction sides of an airfoil such that a corresponding keystone heat shield need not include a cutout.

Another illustrative turbine wheel assembly 310 in accordance with the present disclosure is shown in FIG. 5. The turbine wheel assembly 310 is substantially similar to the turbine wheel assembly 10 shown in FIGS. 1-3. Accordingly, similar reference numbers in the 300 series indicate features that are common between the turbine wheel assembly 10 and the turbine wheel assembly 310 (For example 364, 366, and 312). The description of the turbine wheel assembly 10 is incorporated by reference to apply to the turbine wheel assembly 310, except in instances when it conflicts with the specific description and the drawings of the turbine wheel assembly 310.

The turbine wheel assembly 310 illustratively includes a plurality of turbine blades 314 and a plurality of heat shields as shown in FIG. 5. Heat shields 316 resist movement of gasses radially inward out of or radially outward into the gas path GP.

Unlike the turbine blades 14, most of the turbine blades 314 do not include platforms that extend circumferentially from the airfoils 334 as shown in FIG. 5. Rather, heat shields 316 provide structure defining the gas path GP in lieu of platforms integrated with the turbine blades 314.

To accommodate the lack of platforms, most of the heat shields 316 receive a portion of a corresponding airfoil 334 as shown in FIG. 5. In the illustrative embodiment, most heat shields 316 are formed to include a cutouts 375 shaped to conform to the received portion of a corresponding airfoil 334. More specifically, in the illustrated embodiment, the cutouts 375 are shaped to receive the pressure side or suction side of a corresponding airfoil 334.

In the embodiment shown in FIG. 5, a keystone turbine blade 314' and keystone heat shields 316' are included in the turbine wheel assembly 310. The keystone turbine blade 314' and keystone heat shield 316' are illustratively included to allow for assembly of the turbine wheel 310. The keystone turbine blade 314' includes a platform 336' that extends circumferentially away from a corresponding airfoil 334' in both circumferential directions. The keystone heat shields 316' do not include a cutout that receives any portion of an airfoil.

Figure 6:
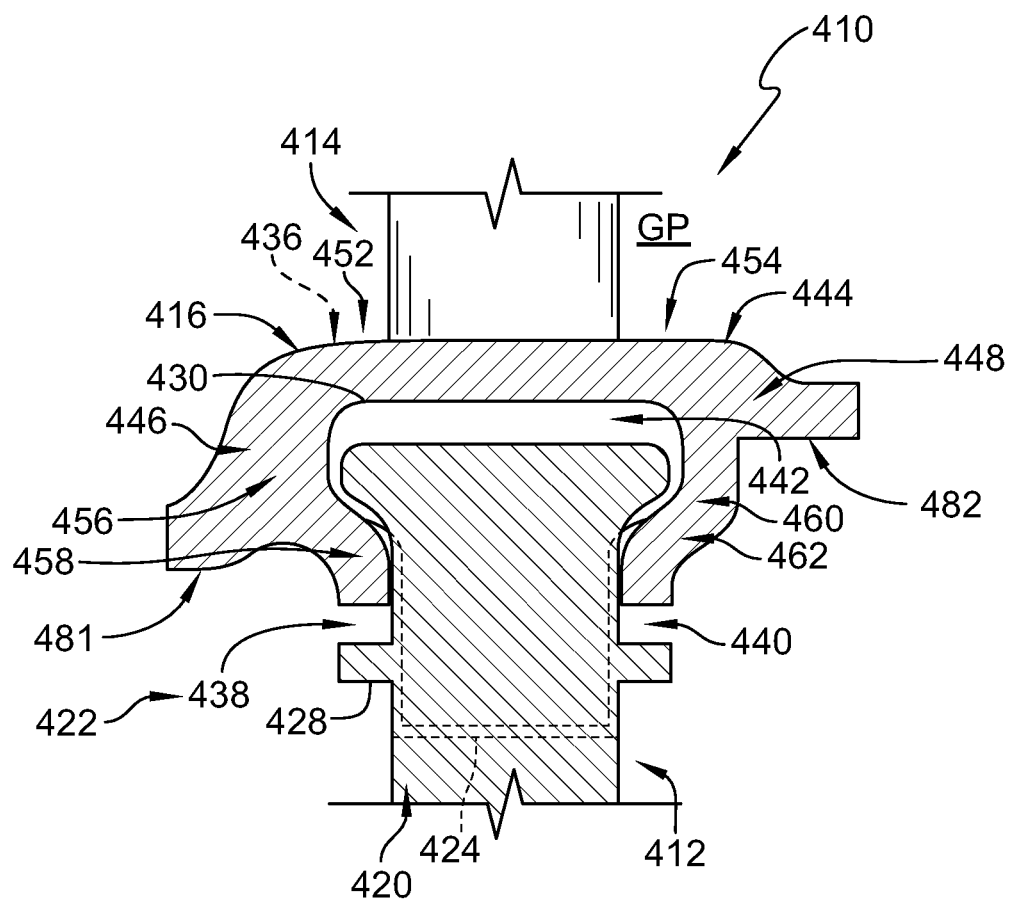
FIG. 6 is a cross sectional view of a fourth turbine wheel assembly similar to the assembly of FIG. 2 showing that heat shields of the turbine wheel assembly are shaped to include radially-inwardly opening channels that receive an outer rim of the disk and are further formed to include forward and aft flanges shaped to extend cantilevered from attachment portions of the heat shields.

FIG. 6 is a cross-sectional view of yet another illustrative turbine wheel assembly 410. The turbine wheel assembly 410 is substantially similar to the turbine wheel assembly 10 shown in FIGS. 1-3. Accordingly, similar reference numbers in the 400 series indicate features that are common between the turbine wheel assembly 10 and the turbine wheel assembly 410 (For example 436, 452, 454, 444, 448, 442, 460, 462, 440, 412, 424, 420, 428, 438, 422, 458, 456, 446, and 430). The description of the turbine wheel assembly 10 is incorporated by reference to apply to the turbine wheel assembly 410, except in instances when it conflicts with the specific description and the drawings of the turbine wheel assembly 410.

Unlike the turbine wheel assembly 10, the turbine wheel assembly 410 includes heat shields 416 having forward and aft flanges 481, 482 as shown in FIG. 5. Forward and aft flanges 481, 482 are shaped to extend cantilevered from attachment portions of the heat shields 416 and are shaped to correspond to platforms (if any) included in turbine blades 414.

The present disclosure provides a way of creating a blade platform that simplifies manufacturing the components and simplifies the assembly of a full annulus set of blade hardware. It also couples the platform to the disk without limiting the space for the blade attachment features in the disk. The blade platform feature is often an integral part of blades made from traditional turbine metal materials. Integrating the platform feature into a blade made from a CMC can be a challenge. The CMC typically has lower material properties than metallics so the radial load needs to be efficiently passed from the airfoil to the attachment of the blade. Having to direct fiber orientations into platform could limit the CMC blade's capability to handle the radial loads.

This disclosure teaches splitting the platform function out as a separate component (heat shield) that would then be coupled to the disk as shown in the disclosed embodiments. The heat shield could be attached to the disk in a number of ways. The heat shield may be formed to wrap around the disk. The heat shield may slide onto the disc circumferentially prior to the blade installation. The disk then constrains the heat shield radially and axially. As the blades are positioned into the disk, the segmented heat shield components are located circumferentially between the blades.

The disclosed arrangements can simplify manufacturing of the airfoil, stalk, and attachment features into a CMC blade when compared to a blade that has an integral platform. Moreover, such construction can limit noodles (deltoids, fillers) in blade components. The blade can also be optimized for aero efficiency.

Manufacturing the heat shield as a separate, standalone component may also be easier than providing an integrated full-size platform. This is of interest relating to heat shields made from CMC. The heat shields can likely be an extrudable shape.

The present designs allow for a circumferential installation of the platform onto the disk. This is a desirable feature since space for axial, platform attachment features is limited in the disk. Heat shield circumferential attachment concepts according to this disclosure do not take away design space from blade attachment region in disk.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine wheel assembly comprising
a turbine disk comprising metallic materials that extends around a central axis, the turbine disk including a central plate and a rim that extends around a periphery of the central plate,
a plurality of turbine blades coupled to the turbine disk, each turbine blade including a root received in a corresponding slot in the turbine disk to couple the turbine blade to the turbine disk and an airfoil that extends outwardly from the turbine disk away from the central axis, and
a plurality of heat shields comprising ceramic matrix composite materials, each heat shield arranged circumferentially between adjacent turbine blades and shaped to form a radially-inwardly opening channel that receives a portion of the rim of the turbine disk to couple the heat shield to the turbine disk so that movement of hot gasses interacting with the airfoils of the turbine blades toward the turbine disk is resisted during use of the turbine wheel assembly in a gas turbine engine,
wherein the rim of the turbine disk includes forward extending portions that extend axially forward away from the central plate and formed to define a forward grove that opens in the axially forward facing direction and aft extending portions that extend axially aft away from the central plate and formed to define an aft groove that opens in an axially-aft facing direction,
wherein each of the plurality of heat shields includes an outer panel located radially outward of the rim of the turbine disk, a forward retainer coupled to the outer panel and extending around at least one of the forward extending portions of the rim, and an aft retainer coupled to the outer panel and extending around at least one of the aft extending portions of the rim,
wherein the forward retainer includes a forward radial arm coupled to a forward end of the outer panel and extending radially inward away from the outer panel toward the central axis and a forward axial arm coupled to the forward radial arm opposite the outer panel and extending axially aft away from the forward radial arm toward the central plate of the turbine disk,
wherein the aft retainer includes an aft radial arm coupled to an aft end of the outer panel and extending radially inward away from the outer panel toward the central axis and an aft axial arm coupled to the aft radial arm opposite the outer panel and extending axially forward away from the aft radial arm toward the central plate of the turbine disk, and
wherein the forward axial arm includes a forward inner surface that extends directly from the forward radial arm and faces the turbine disk, a forward outer surface spaced apart axially in a forward direction from the forward inner surface and faces away from the turbine disk, and a forward radial surface that extends from the forward inner surface in the axially forward direction away from the turbine disk to the forward outer surface to interconnect directly the forward inner surface and the forward outer surface to form a radially terminating end of the forward axial arm, the forward inner surface has a curvilinear shape that extends axially in an aft direction toward the turbine disk and in a radially inward direction toward the central axis, and wherein the forward axial arm is located in the forward groove to couple the heat shield to the turbine disk, and wherein the aft axial arm includes an aft inner surface that extends directly from the aft radial arm and faces the turbine disk, an aft outer surface spaced apart axially in an aft direction from the aft inner surface and faces away from the turbine disk, and an aft radial surface that extends from the aft inner surface in the axially aft direction away from the turbine disk to the aft outer surface to interconnect directly the aft inner surface and the aft outer surface to form a radially terminating end of the aft axial arm, the aft inner surface has a curvilinear shape that extends axially in a forward direction toward the turbine disk and in a radially inward direction toward the central axis, and wherein the aft axial arm is located in the aft groove to couple the heat shield to the turbine disk to block radially outward movement of the heat shield out of engagement with the disk.

2. The turbine wheel assembly of claim 1, wherein each turbine blade includes a platform arranged radially between the root and the airfoil that extends circumferentially around a portion of the rim so that movement of hot gasses interacting with the airfoils of the turbine blades toward the turbine disk is resisted during use of the turbine wheel assembly in a gas turbine engine.

3. The turbine wheel assembly of claim 2, wherein the platform of each turbine blade extends circumferentially in both directions from a pressure side and a suction side of a corresponding airfoil around a portion of the rim.

4. The turbine wheel assembly of claim 2, wherein the platform of at least one turbine blade extends circumferentially in only one direction from a corresponding airfoil around a portion of the rim.

5. The turbine wheel assembly of claim 4, wherein at least one of the plurality of heat shields is formed to include a cutout that receives a portion of a corresponding airfoil.

6. The turbine wheel assembly of claim 5, wherein the platform of at least one turbine blade extends circumferentially in both directions from a pressure side and a suction side of a corresponding airfoil around a portion of the rim.

7. The turbine wheel assembly of claim 1, wherein most of the heat shields are formed to include cutouts on opposing circumferential sides that receive a portion of an airfoil included in adjacent turbine blades.

8. The turbine wheel assembly of claim 1, wherein the rim of the turbine disk extends axially forward and aft of the central plate adjacent to the rim.

9. The turbine wheel assembly of claim 1, wherein each of the forward extending portions is spaced apart circumferentially from a neighboring one of the forward extending portions and each of the aft extending portions is spaced apart circumferentially from a neighboring one of the aft extending portions.

10. A turbine wheel assembly comprising a turbine disk comprising metallic materials that extends around a central axis, the turbine disk including a central plate and a rim that extends around a periphery of the central plate, a plurality of turbine blades coupled to the turbine disk, each turbine blade including a root received in a corresponding slot in the turbine disk to couple the turbine blade to the turbine disk and an airfoil that extends outwardly from the turbine disk away from the central axis, and a plurality of heat shields comprising ceramic matrix composite materials and coupled to the turbine disk, each heat shield shaped to receive a portion of the rim of the turbine disk to block radially outward movement of the heat shield out of engagement with the disk, wherein the rim of the turbine disk includes forward extending portions that extend axially forward away from the central plate and formed to define a forward grove that opens in the axially forward facing direction and aft extending portions that extend axially aft away from the central plate and formed to define an aft groove that opens in an axially-aft facing direction, wherein one of the forward extending portions of the rim is shaped to define a forward rounded mating surface and one of the aft extending portions of the rim is shaped to define an aft rounded mating surface, wherein each of the plurality of heat shields includes an outer panel located radially outward of the rim of the turbine disk, a forward retainer coupled to the outer panel and extending around at least one of the forward extending portions of the rim, and an aft retainer coupled to the outer panel and extending around at least one of the aft extending portions of the rim, wherein the forward retainer includes a forward radial arm coupled to a forward end of the outer panel and extending radially inward away from the outer panel toward the central axis and an forward axial arm coupled to the forward radial arm opposite the outer panel and extending axially aft away from the forward radial arm toward the central plate of the turbine disk and radially inward toward the central axis, wherein the aft retainer includes an aft radial arm coupled to an aft end of the outer panel and extending radially inward away from the outer panel toward the central axis and an aft axial arm coupled to the aft radial arm opposite the outer panel and extending axially forward away from the aft radial arm toward the central plate of the turbine disk and radially inward toward the central axis, wherein the forward axial arm includes a forward inner surface that extends directly from the forward radial arm and faces the turbine disk, a forward outer surface spaced apart axially in a forward direction from the forward inner surface and faces away from the turbine disk, and a forward radial surface that extends from the forward inner surface in the axially forward direction away from the turbine disk to the forward outer surface to interconnect directly the forward inner surface and the forward outer surface to form a radially terminating end of the forward axial arm, the forward inner surface has a curvilinear shape that extends axially in an aft direction toward the turbine disk and in a radially inward direction toward the central axis, and wherein the forward axial arm is located in the forward groove to couple the heat shield to the turbine disk, and wherein the aft axial arm includes an aft inner surface that extends directly from the aft radial arm and faces the turbine disk, an aft outer surface spaced apart axially in an aft direction from the aft inner surface and faces away from the turbine disk, and an aft radial surface that extends from the aft inner surface in the axially aft direction away from the turbine disk to the aft outer surface to interconnect directly the aft inner surface and the aft outer surface to form a radially terminating end of the aft axial arm, the aft inner surface has a curvilinear shape that extends axially in a forward direction toward the turbine disk and in a radially inward direction toward the central axis, and wherein the aft axial arm is located in the aft groove to couple the heat shield to the turbine disk to block radially outward movement of the heat shield out of engagement with the disk.

11. The turbine wheel assembly of claim 10, wherein at least a portion of each heat shield is C-shaped when viewed in a circumferential direction around the central axis.

12. The turbine wheel assembly of claim 11, wherein each heat shield forms a radially-inwardly opening channel that receives the portion of the rim.

13. The turbine wheel assembly of claim 11, wherein the rim of the turbine disk extends axially forward and aft of the central plate adjacent to the rim.

14. The turbine wheel assembly of claim 10, wherein each turbine blade includes a platform arranged radially between the root and the airfoil that extends circumferentially around a portion of the rim so that movement of hot gasses interacting with the airfoils of the turbine blades toward the turbine disk is resisted during use of the turbine wheel assembly in a gas turbine engine.

15. The turbine wheel assembly of claim 14, wherein the platform of each turbine blade extends circumferentially in both directions from a pressure side and a suction side of a corresponding airfoil around a portion of the rim.

16. The turbine wheel assembly of claim 14, wherein the platform of at least one turbine blade extends circumferentially in only one direction from a corresponding airfoil around a portion of the rim, wherein at least one of the plurality of heat shields is formed to include a cutout that receives a portion of a corresponding airfoil, and wherein the platform of at least one turbine blade extends circumferentially in both directions from a pressure side and a suction side of a corresponding airfoil around a portion of the rim.

17. The turbine wheel assembly of claim 10, wherein at least one turbine blade includes a platform arranged radially between the root and the airfoil that extends circumferentially in both directions from a pressure side and a suction side of a corresponding airfoil around a portion of the rim, wherein most turbine blades transition smoothly from the root to the airfoil without a platform, and wherein most of the heat shields are formed to include cutouts on opposing circumferential sides that receive a portion of an airfoil included in adjacent turbine blades.

18. The turbine wheel assembly of claim 10, wherein each of the forward extending portions is spaced apart circumferentially from a neighboring one of the forward extending portions and each of the aft extending portions is spaced apart circumferentially from a neighboring one of the aft extending portions.

* * * * *